Oct. 13, 1925.
P. W. HALLVARSON
COMBINATION TOOL
Filed July 7, 1924
1,556,788
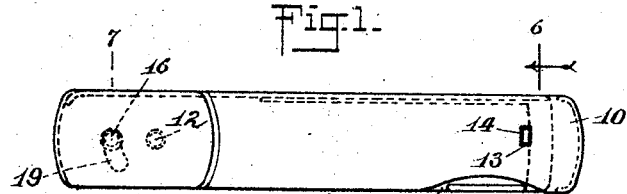
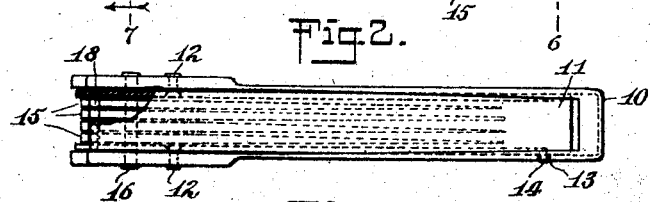
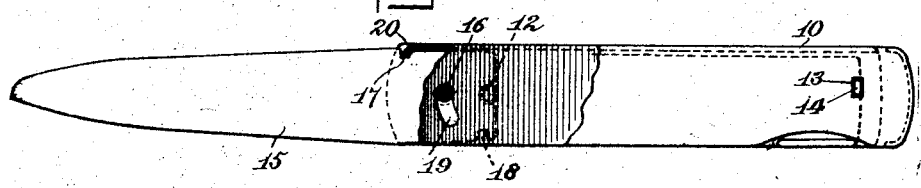
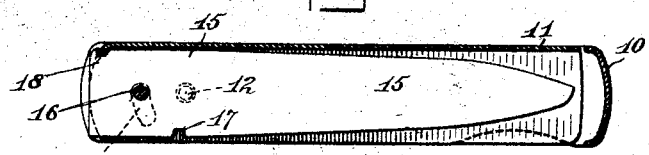
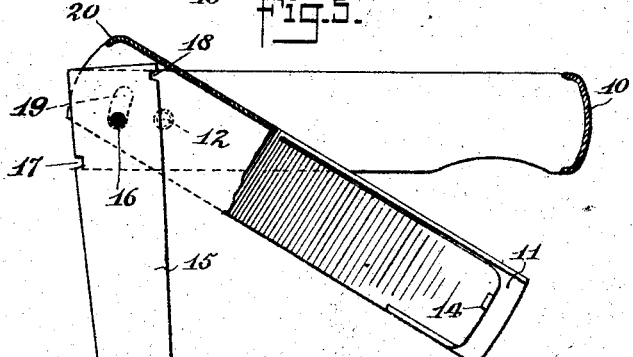
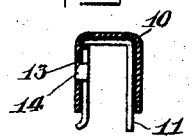
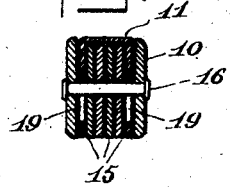
WITNESSES
INVENTOR
Peter W. Hallvarson
BY
ATTORNEYS Patented Oct. 13, 1925.

1,556,788

UNITED STATES PATENT OFFICE.

PETER WILLIAM HALLVARSON, OF BLACK DIAMOND, ALBERTA, CANADA.

COMBINATION TOOL.

Application filed July 7, 1924. Serial No. 724,675.

*To all whom it may concern:*

Be it known that I, PETER W. HALLVARSON, a citizen of Canada, and a resident of Black Diamond, in the Province of Alberta and Dominion of Canada, have invented a new and Improved Combination Tool, of which the following is a description.

My invention relates to a tool comprising a handle and a plurality of separate implements any one of which may be brought into position for use and all of which may be folded into the handle.

The general object of my invention is to provide a combination tool of the indicated type in which coacting means are provided on the handle and on the separate implements and so arranged that the locking means will function to hold any one implement firmly in position for use or to firmly hold all the implements in the folded position within the handle.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a combination tool embodying my invention with the implements in folded position, housed within the handle;

Fig. 2 is an edge view of the tool with the implements in folded position, a part of one of the handle sections being broken away;

Fig. 3 is a side elevation of the combination tool with one of the implements locked in position for use, certain parts being shown in section;

Fig. 4 is a longitudinal section of the combination tool with parts in the folded position;

Fig. 5 is a longitudinal section showing sections of the handle swung on their pivotal connection relatively to each other to release the implements and permit of an implement being positioned for use; and Figs. 6 and 7 are cross-sections respectively on the lines 6—6 and 7—7 of Fig. 1.

In carrying out my invention in accordance with the illustrated example two handle sections 10, 11 are provided, the inner section 11 being adapted to swing to a position within the outer section 10 or to a position in a plane at an angle to the outer section as shown in Fig. 5.

The two handle sections 10, 11 have their adjacent sides pivoted together as at 12, said pivots 12 being a short distance from one end of the handle sections. Adjacent to the opposite end of the handle sections latch means is provided to hold the two handle sections in folded or closed position, there being shown for the purpose in the illustrated example a small opening 13 on the outer section and a protuberance 14 on the inner section adapted to spring into said opening 13.

A plurality of implements 15 is provided which may be in the form of knife blades, screw-drivers, or the like. These implements 15 are disposed between the sides of the inner handle section 11 and are pivotally secured by a transverse pivot 16 extending through both handle sections and through said implements. Thus it will be observed that the handle sections 10, 11 may swing relatively to each other about one center (the axis of alined pivots 12), and the blades swing relatively to both handles about a second center, to wit, the axis of the pivot 16.

In order to effect the locking of the implements 15 either in the operative or the folded position by the movement of the handle sections relatively to each other, each implement is formed with a side notch 17, in one edge, distant from that end edge of the implement adjacent to the pivot 16 and each implement at the opposite edge is formed with a second notch 18 close to the adjacent end edge, that is to say, the notches 17 and 18 are in transverse planes distant from each other. The pivot 16 extends through slots 19 in the sides of the inner handle section 11 to permit of said handle section 11 turning about the axis of the pivots 12 and relatively to the implements 15.

On the handle section 11 at the end edge adjacent the pivot is a lip 20 directed laterally inward, which lip 20 is adapted to enter the notches 18 in the implements 15 when the implements are folded into the handle sections as shown in Fig. 4, or to enter the notch 17 of that implement 15 which is swung forwardly to position for use as shown in Fig. 3, so that in either position of an implement, that is to say, either within the handle section 11 or extended forwardly for use, the handle section 11 by its lip 20 effects a locking of the implement. Hence, a firm locking of the implements is insured in both positions of the implements.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:

1. A combination tool comprising a handle, said handle including two sections pivoted to each other adjacent to one end, means additional to the pivots of the handle sections to pivot various implements to the handle, and coacting and interengaging means embodied in said implements and appurtenant to one of the handle sections to lock the implements either in a folded position within the handle or in an extended position for use.

2. A combination tool comprising handle sections, the one adapted to be accommodated within the other, means pivoting said handle sections together to swing relatively to each other, a series of implements adapted to be accomodated within the inner handle section, pivot means securing said implements to the outer handle section, said inner handle section having a slot through which said last mentioned pivot means extends, and means to lock the implements to the handle when said implements are in position within the handle or when an implement is swung out of the handle and extended for use.

3. A combination tool comprising two handle sections pivoted together to swing relatively to each other, one section being foldable within the other section and adapted to move to a position at an angle to the other section, an implement accommodated within the inner section and pivoted to the outer section, and means to lock said implement in a position extending from the handle for use, said lock means comprising a member on the inner handle section, the said implement having a notch to receive said locking member on the inner handle section.

4. A combination tool comprising an outer handle section, an inner handle section foldable into the outer section and swingable to a position at an angle to the outer section, an implement accommodated within the inner handle and swingable therefrom to a position extended beyond the handle for use, a pivot extending transversely through said implement and through both sides of the outer handle section, the inner handle section having a slot through which said pivot extends, and a locking lip on the inner handle section, said implement having a notch in one side edge adjacent to that end edge nearest said pivot and having a second notch in the opposite side edge a greater distance from the said end edge than the first-mentioned notch, either of said notches being adapted to receive said lip for locking said implement either in the folded position within the handle or in an extended position.

PETER WILLIAM HALLVARSON.